US007963013B2

(12) United States Patent
Sluiter

(10) Patent No.: US 7,963,013 B2
(45) Date of Patent: Jun. 21, 2011

(54) TRUSS ASSEMBLY APPARATUS AND METHOD

(76) Inventor: Scott E. Sluiter, Holland, MI (US)

(*) Notice: Subject to any disclaimer, the term of this patent is extended or adjusted under 35 U.S.C. 154(b) by 819 days.

(21) Appl. No.: 11/961,522

(22) Filed: Dec. 20, 2007

(65) Prior Publication Data

US 2008/0149582 A1 Jun. 26, 2008

Related U.S. Application Data

(60) Provisional application No. 60/876,378, filed on Dec. 21, 2006.

(51) Int. Cl.
*B23Q 1/25* (2006.01)

(52) U.S. Cl. .......................... 29/281.1; 29/281.5; 269/37

(58) Field of Classification Search ................. 29/281.1, 29/283.5; 269/37, 905, 310, 304
See application file for complete search history.

(56) References Cited

U.S. PATENT DOCUMENTS

| | | | | |
|---|---|---|---|---|
| 5,092,028 | A * | 3/1992 | Harnden | 29/709 |
| 5,617,622 | A * | 4/1997 | Anderson | 29/281.3 |
| 5,873,567 | A * | 2/1999 | Williams | 269/37 |
| 5,947,460 | A * | 9/1999 | Williams | 269/37 |
| 7,269,901 | B2 * | 9/2007 | Robin | 29/897.31 |
| 2002/0060386 | A1 * | 5/2002 | Konieczny | 269/56 |
| 2008/0149582 | A1 * | 6/2008 | Sluiter | 212/179 |

* cited by examiner

*Primary Examiner* — Lee D Wilson

(74) *Attorney, Agent, or Firm* — Price, Heneveld Cooper, DeWitt & Litton, LLP

(57) ABSTRACT

A truss assembly apparatus includes a plurality of movable fastener securing devices. A controller moves the fastener securing devices to position the fastener securing devices in a selected pattern to provide for assembly of a truss. The apparatus includes a powered conveyor arrangement that moves the trusses through the apparatus during the assembly process.

33 Claims, 12 Drawing Sheets

125 126 127 128 129 130 131 121 122 123

| | X | Y | | | | |
|---|---|---|---|---|---|---|
| F | 0.75 | 10.3529 | 7 | 0 | 2 | 1 |
| F | 0.3102 | 11.2163 | 7 | 0 | 2 | 1 |
| F | 0.3469 | 9.9499 | 7 | 0 | 2 | 1 |
| F | 1.1531 | 10.756 | 7 | 0 | 2 | 1 |
| F | 0.465 | 1.695 | 7 | 0 | 1 | 2 |
| F | 0.465 | 0.7735 | 7 | 0 | 1 | 2 |
| F | 1.035 | 0.7735 | 7 | 0 | 1 | 2 |
| F | 1.035 | 1.695 | 7 | 0 | 1 | 2 |
| R | 12 | | | | | |
| F | 16.965 | 26.7817 | 15 | 0 | 4 | 1 |
| F | 15.3612 | 24.9641 | 5 | 0 | 4 | 1 |
| F | 15.8121 | 25.415 | 5 | 0 | 4 | 1 |
| F | 16.965 | 27.7032 | 15 | 0 | 4 | 1 |
| . | . | . | . | . | . | . |
| . | . | . | . | . | . | . |
| . | . | . | . | | | |
| F | 117.1054 | 1.695 | 7 | 0 | 11 | 2 |
| I | 120 | | | | | |
| F | 158.9245 | 26.7817 | 7 | 0 | 12 | 1 |
| F | 158.3545 | 26.7817 | 7 | 0 | 12 | 1 |
| F | 159.4945 | 26.7817 | 7 | 0 | 12 | 1 |
| F | 160.0645 | 26.7817 | 7 | 0 | 12 | 1 |
| F | 161.715 | 26.7817 | 7 | 0 | 14 | 1 |
| F | 161.715 | 27.7032 | 7 | 0 | 14 | 1 |
| F | 162.285 | 26.7817 | 7 | 0 | 14 | 1 |
| S | 162.285 | 27.7032 | 7 | 0 | 14 | 1 |
| S | 209.465 | 26.7817 | 15 | 0 | 15 | 1 |
| S | 207.4446 | 26.7817 | 5 | 0 | 15 | 1 |
| F | 208.2086 | 26.7817 | 5 | 0 | 15 | 1 |
| F | 209.465 | 27.7032 | 15 | 0 | 15 | 1 |
| F | 209.75 | 23.681 | 5 | 0 | 15 | 1 |
| F | 209.75 | 24.304 | 5 | 0 | 15 | 1 |
| F | 210.035 | 26.7817 | 15 | 0 | 15 | 1 |
| F | 210.035 | 27.7032 | 15 | 0 | 15 | 1 |
| F | 211.1756 | 25.3807 | 5 | 0 | 15 | 1 |
| F | 211.6681 | 24.8883 | 5 | 0 | 15 | 1 |
| F | 161.715 | 1.695 | 7 | 0 | 13 | 2 |
| F | 161.715 | 0.7735 | 7 | 0 | 13 | 2 |
| F | 162.285 | 0.7735 | 7 | 0 | 13 | 2 |
| F | 162.285 | 1.695 | 7 | 0 | 13 | 2 |
| F | 209.465 | 1.695 | 7 | 0 | 16 | 2 |
| F | 209.465 | 0.7735 | 7 | 0 | 16 | 2 |
| F | 210.035 | 0.7735 | 7 | 0 | 16 | 2 |
| F | 210.035 | 1.695 | 7 | 0 | 16 | 2 |
| R | 214.9534 | . | . | . | . | . |

FIG. 17

TRUSS ASSEMBLY APPARATUS AND METHOD

CROSS-REFERENCE TO RELATED APPLICATIONS

This application claims the benefit of U.S. Provisional Application No. 60/876,378, filed on Dec. 21, 2006, entitled TRUSS ASSEMBLY PROGRAM AND METHOD, the entire contents of which are incorporated by reference.

BACKGROUND OF THE INVENTION

Roof structures for buildings and the like commonly include one or more trusses spanning between the building walls and to support the roof structure. Such trusses typically include upper and lower chords, and a plurality of webs extending between the chords. The webs provide structural support to reinforce the truss. The chords and webs may be made of a metallic material having any one of a number of cross-sectional shapes, such as a U-shape. The ends of the webs are secured to the upper and lower chords via a secure structural interconnection. One type of construction includes use of connector plates or the like made of a relatively thin metal. The connector plates are positioned at the ends of the webs at the upper and lower chords, and one or more self-drilling screws or the like are driven through the webs, connector plates, and upper and lower chords to securely interconnect the truss members.

The shape and size of trusses may vary substantially from one building to another depending upon on the architectural design of the building. Further, a given building may include several different truss designs to accommodate various roof contours and configurations of the building. Accordingly, roof trusses are often custom designed for a particular building, and the number of trusses having a particular configuration may be relatively small. In some cases, only one truss of a particular configuration may be required.

The assembly of roof trusses has heretofore been quite labor intensive and costly because the trusses have been manually assembled, and the screws interconnecting the truss components have been driven by workers utilizing a power tool.

SUMMARY OF THE INVENTION

One aspect of the present invention is an apparatus for assembling trusses including a frame structure having an input side, an output side, and a workspace between the input side and the output side. A powered infeed clamp is mounted to the frame structure adjacent the input side for clamping a truss at the input side of the frame structure. A powered outfeed clamp is mounted to the frame structure adjacent the output side, and the outfeed clamp is configured to clamp a truss at the output side of the frame structure. The apparatus further includes a first gantry having a first elongated support structure spanning the workspace, and a first powered actuator operably coupled to the first gantry for shifting the first gantry in a direction transverse to the first elongated support structure. The apparatus further includes a second gantry having a second elongated support structure spanning the workspace, and a second powered actuator operably coupled to the second gantry for shifting the second gantry in a second direction that is transverse to the second elongated support structure. A first powered screw driving head is movably mounted to the first elongated support structure, and a third powered actuator is operably coupled to the first powered screw driving head. The third powered actuator shifts the first powered screw driving head along the first elongated support structure. The apparatus further includes a second powered screw driving head that is movably mounted to the second elongated support structure, and a fourth powered actuator that is operably coupled to the second powered screw driving head. The fourth powered actuator shifts the second powered screw driving head along the second elongated support structure. The apparatus also includes a controller that is coupled to the first and second powered clamps, the first, second, third, and fourth powered actuators, and the first and second powered screw driving heads. The controller is configured to actuate the powered infeed and outfeed clamps to selectively retain a truss in the apparatus. The controller is also configured to actuate the first, second, third, and fourth powered actuators to shift the first and second powered screw driving heads to a plurality of screw-driving positions. The controller actuates the powered screw driving heads to drive screws at the screw-driving positions.

Another aspect of the present invention is an apparatus for assembling trusses. The apparatus includes a frame structure having an input side and an output side, and at least one clamp connected to the frame structure for clamping a truss that is to be assembled by the apparatus. The apparatus also includes at least one powered screw driving head configured to drive screws into truss members that are to be assembled by the apparatus. At least one powered actuator is operably connected to the frame structure and to the at least one screw driving head. The actuator shifts the at least one screw driving head relative to the clamp upon actuation of the powered actuator. The apparatus further includes a controller operably coupled to the powered actuator and the powered screw driving head. The controller is configured to signal the powered actuator and shift the at least one of the clamp and the powered screw driving head relative to the other of the clamp and the powered screw driving head to a plurality of screw positions at joints of truss members forming a truss to be assembled by the apparatus. The controller actuates the powered screw driving head to drive screws at the screw positions and interconnect truss members of a truss being assembled by the apparatus.

These and other features, advantages, and objects of the present invention will be further understood and appreciated by those skilled in the art by reference to the following specification, claims, and appended drawings.

BRIEF DESCRIPTION OF THE DRAWINGS

FIG. 13;

FIG. 13, FIG. 16 is a partially schematic view of a truss showing index lines and zones that may be utilized in control of the truss assembly apparatus; and FIG. 17 is a data file in .csv format generated by the method/program for use by a truss assembly machine.

DETAILED DESCRIPTION OF PREFERRED EMBODIMENT

Figure 1:
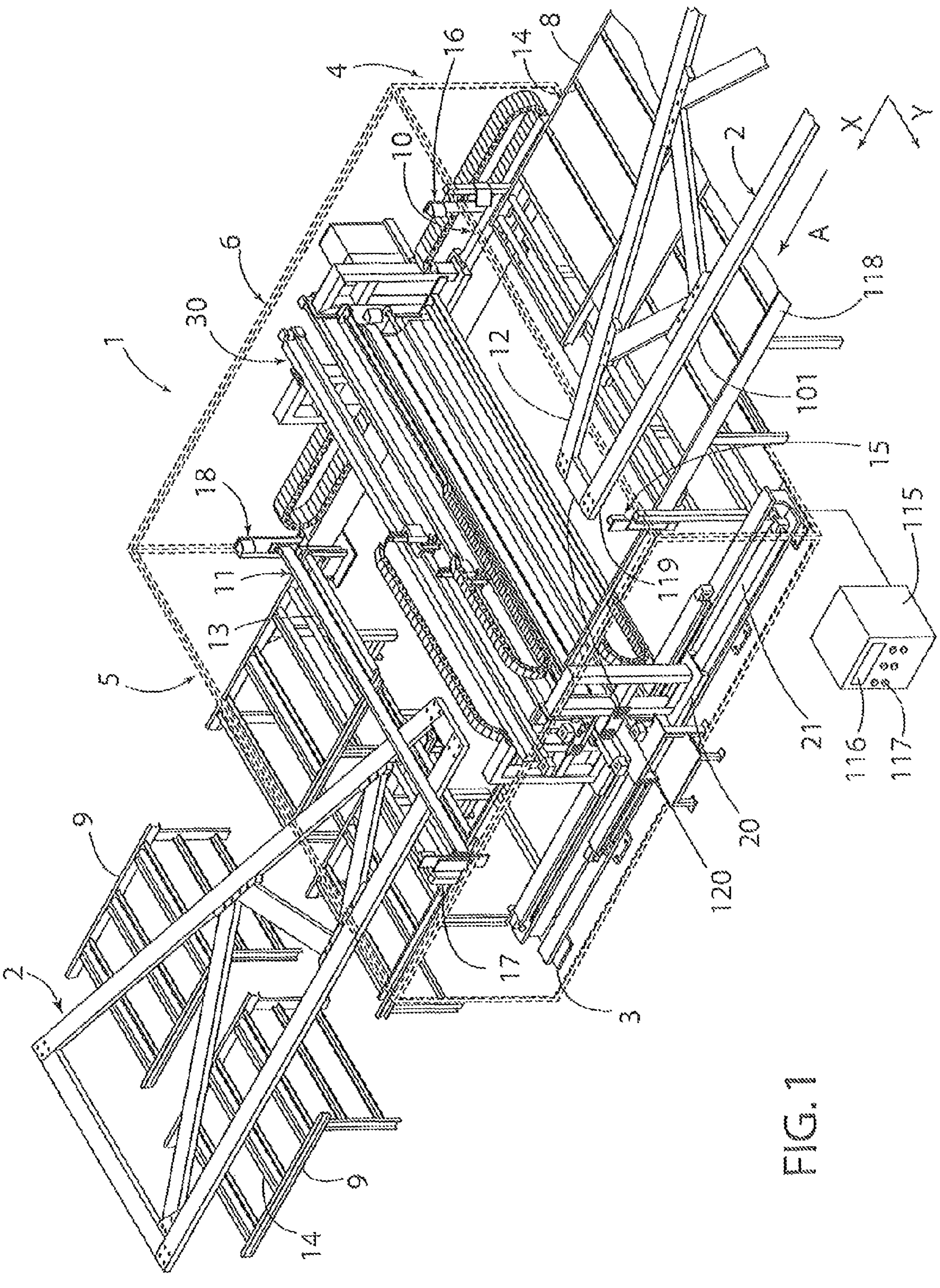
FIG. 1 is a partially fragmentary perspective view of an apparatus for assembling trusses according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present application is related to co-pending U.S. patent application Ser. No. 11/962,702, entitled PROGRAM AND METHOD FOR LOCATING FASTENERS, the entire contents of which are incorporated by reference.

Figure 3:
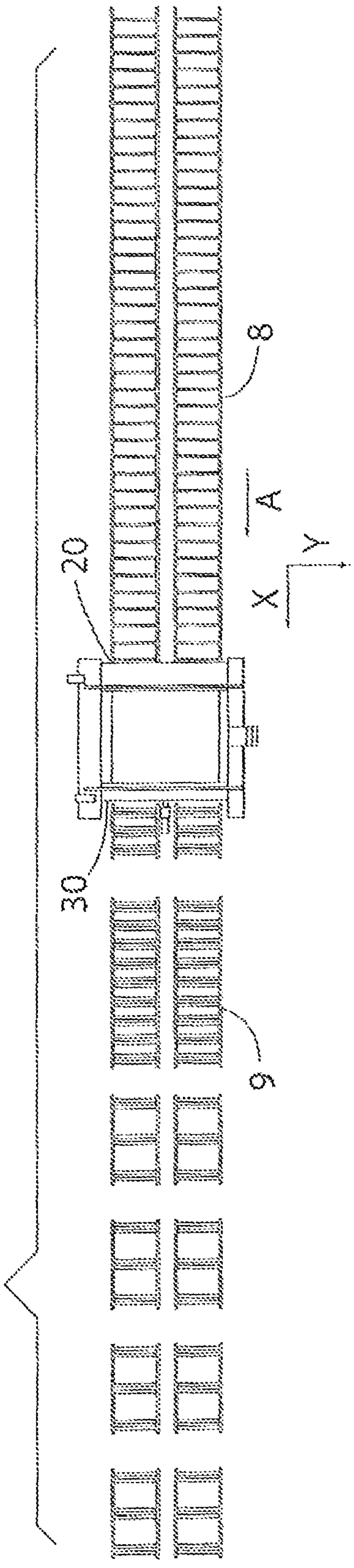
FIG. 3 is a plan view of the apparatus for assembling trusses of FIG. 1.
Figure 4:
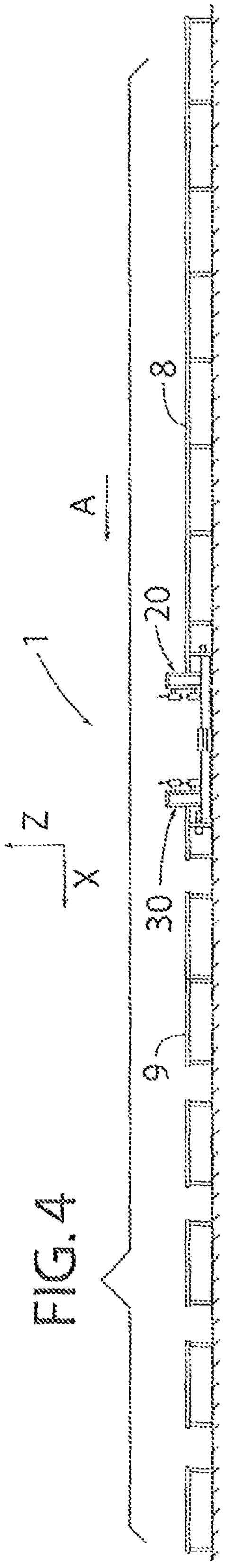
FIG. 4 is an elevational view of the apparatus of FIG. 3.

With reference to FIG. 1, an apparatus 1 for assembling trusses 2 includes a frame structure 3, and first and second gantries 20 and 30, respectively, that are movably mounted to the frame 3. Apparatus 1 defines an input side 4, at which trusses 2 enter apparatus 1, and an output side 5 at which trusses 2 exit apparatus 1. A workspace or work envelope 6 is formed between the input side 4 and output side 5. As discussed in more detail below, trusses 2 are moved through the apparatus 1 in a workflow direction (arrow "A") by one or more conveyors such as the movable gantries 20 and 30. With reference to FIGS. 3 and 4, one or more input supports 8 and output supports 9 may be utilized to support the trusses 2 as they are being fed into the apparatus 1 and as the trusses 2 exit the apparatus 1. Input and output supports 8, 9 may include a plurality of rollers 14 to facilitate movement of the trusses 2.

Referring back to FIG. 1, a stationary infeed clamp 10 is mounted to the frame 3 adjacent the input side 4, and a stationary outfeed clamp 11 is mounted to the frame 3 adjacent the output side 5 of frame 3. Infeed clamp 10 and outfeed clamp 11 are stationary relative to frame 3 and hold trusses 2 in a stationary position while the gantries 20 and/or 30 drive fasteners into truss 2. Infeed clamp 10 and outfeed clamp 11 include elongated clamp members 12 and 13, respectively, that shift downwardly to clamp trusses 2 in place and hold the trusses 2 in a stationary position during the assembly process. The opposite ends of clamp member 12 are connected to powered linear guides 15 and 16, and the opposite ends of clamp member 13 are connected to powered linear guides 17 and 18. Powered linear guides 15-18 include pneumatic cylinders or linear electrical actuators that are operably connected to controller 115 and linear slides to provide vertical motion of clamp members 12 and 13.

Figure 5:
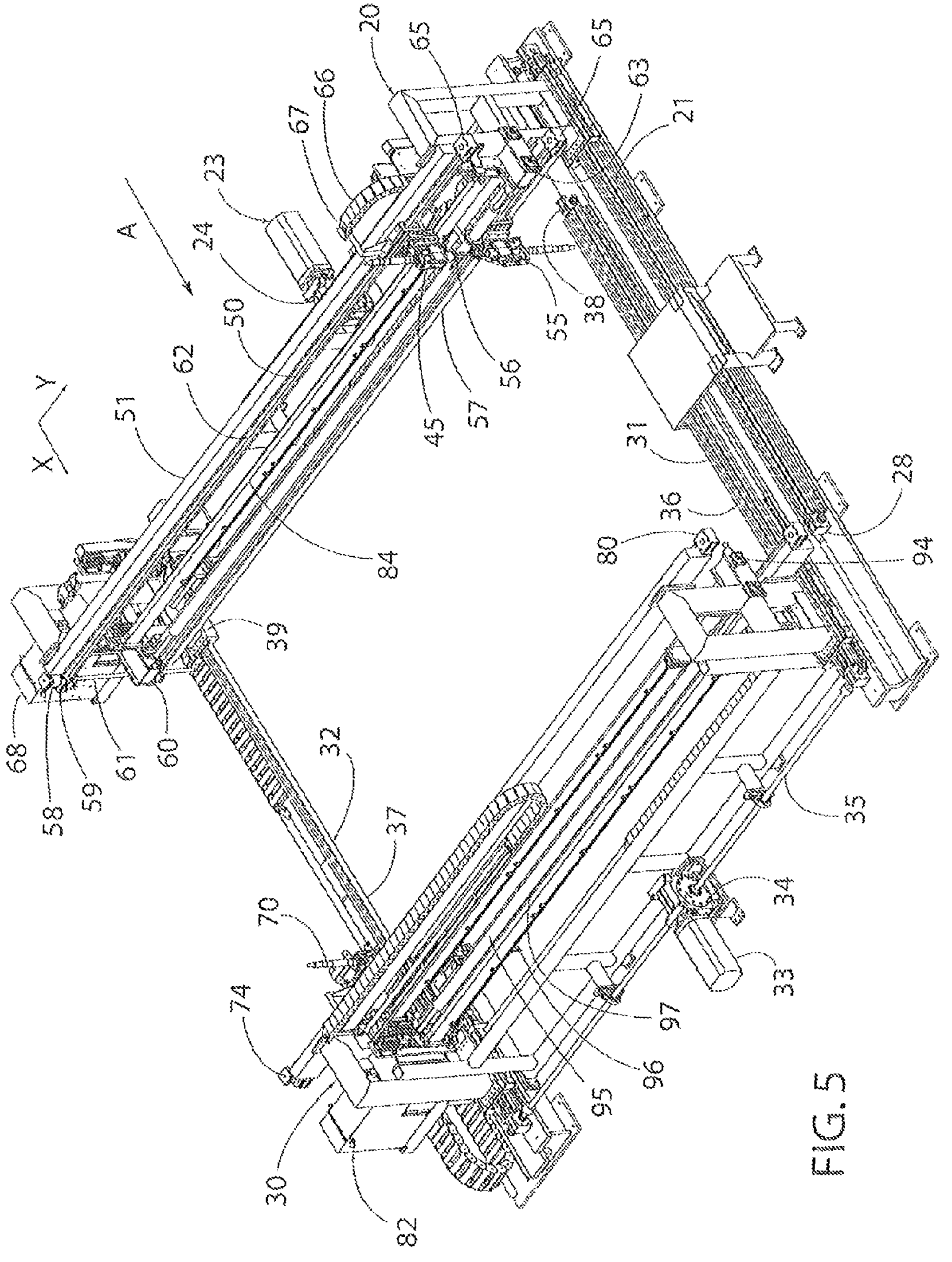
FIG. 5 is an isometric view of the gantries and gantry support structure of the apparatus of FIG. 1.
Figure 6:
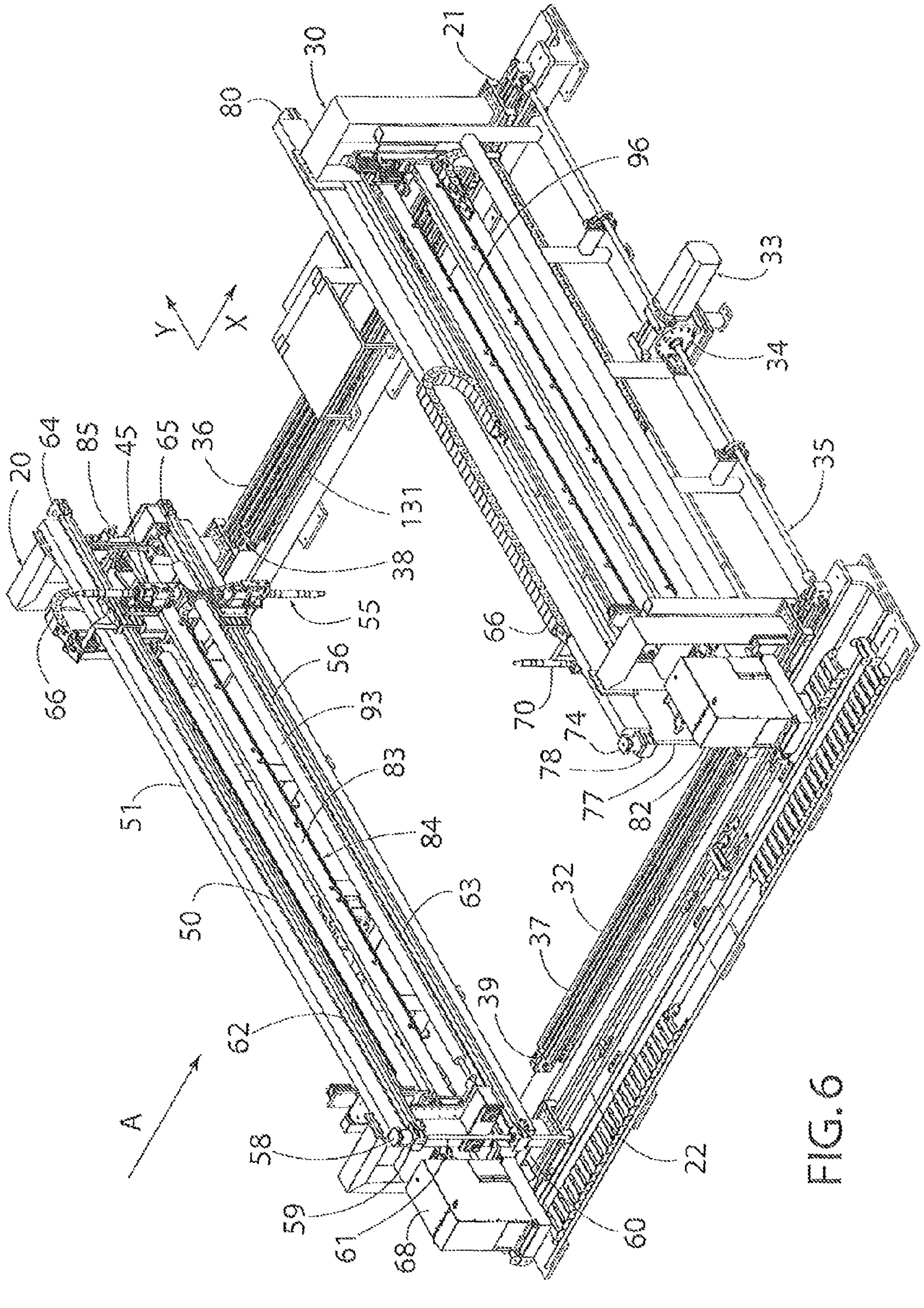
FIG. 6 is an isometric view of the gantries and gantry support structure of FIG. 5 from a different angle.
Figure 7:
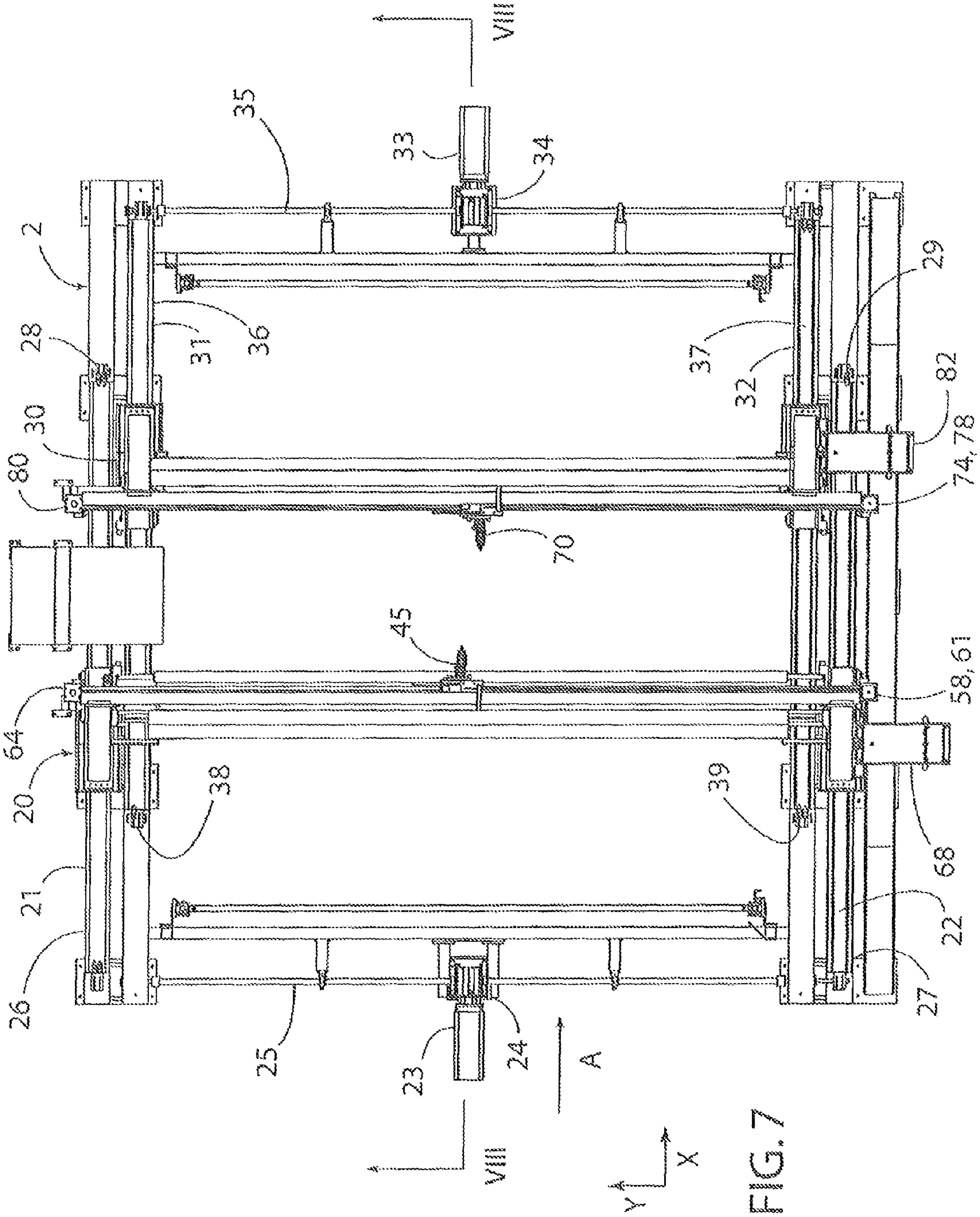
FIG. 7 is a top plan view of the gantries and gantry support structure.
Figure 8:
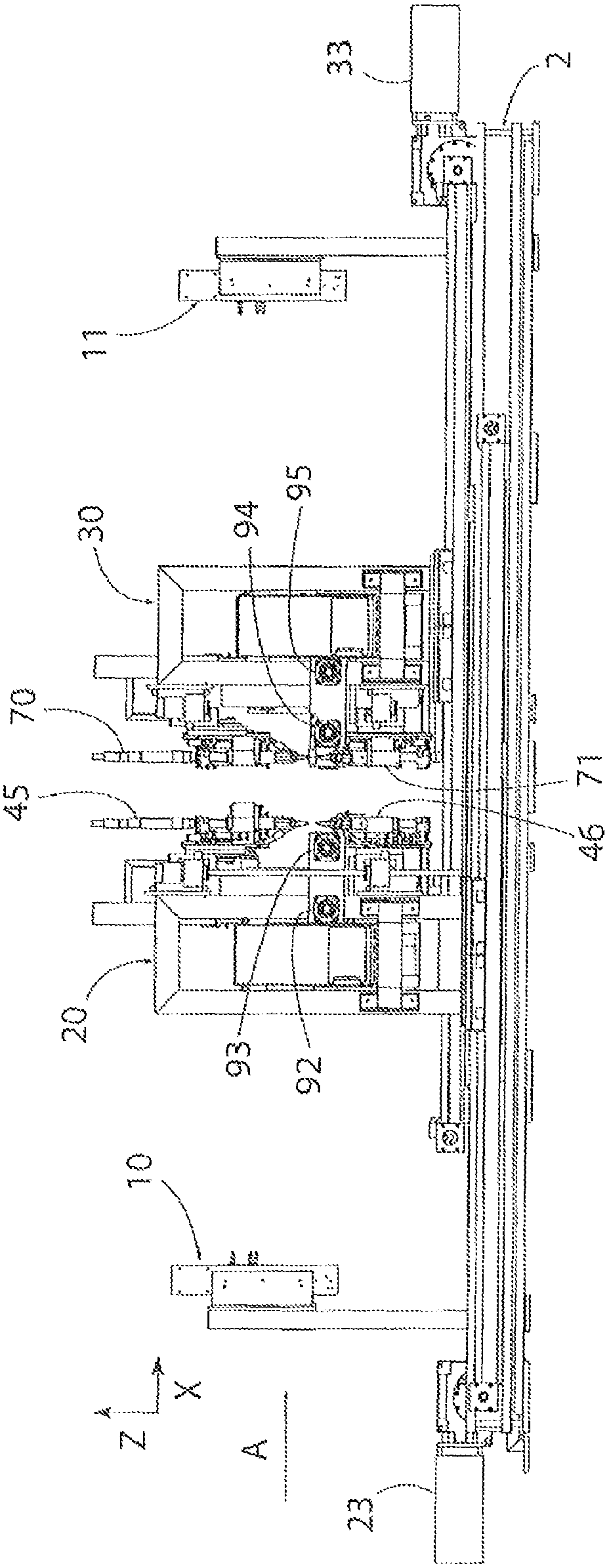
FIG. 8 is a side elevational view of the gantries and gantry support structure.

With further reference to FIGS. 5-7, first gantry 20 is movably mounted to horizontal first rails 21 and 22. A first electric servo motor 23 drives the first gantry 20 via a gear box 24 that rotates shaft 25. Shaft 25 drives looped belts 26 and 27 via cogged drive pulley or the like at the opposite ends of shaft 25. Looped bolts 26 and 27 extend around idler pulleys 28 and 29, respectively. Gantry 20 is connected to looped belts 26 and 27, and rotation of servo motor 23 thereby causes the first gantry 20 to shift along rails 21 and 22 along an "x" axis (i.e., in the direction of the arrow "A", and opposite the direction of the arrow "A"). The rails 21 and 22, belts 26 and 27, and idler pulleys 28 and 29 are commercially available parts, and they are not therefore described in detail herein.

Second gantry 30 is substantially a mirror image of first gantry 20. Second gantry 30 is movably mounted to the frame 3 via second rails 31 and 32 (FIG. 7), and a second servo motor 33, second gear box 34, second rotating shaft 35, and looped belts 36 and 37, and idler pulleys 38 and 39 that together move the second gantry 30 along rails 31 and 32 in the "x" direction upon actuation of servo motor 33.

A first gantry clamp 84 on first gantry 20 is operably connected to controller 115 to selectively clamp trusses 2. Similarly, a second gantry clamp 96 on second gantry 30 is also connected to controller 115. As discussed in detail below, gantry clamps 84 and 96 selectively clamp trusses 2, and servos 23 and 33 move gantries 20 and 30 to thereby move trusses 2 through apparatus 1.

When first gantry 20 is moved to its closest possible position relative to input side 4 of apparatus 1, gantry 20 defines a forward edge of a work envelope at which screws can be driven into truss 2. Similarly, when second gantry 30 is moved to its closest possible position relative to output side 5 of frame structure 3, gantry 30 defines a rearward edge of the work envelope.

Figures 9, 10, 11:
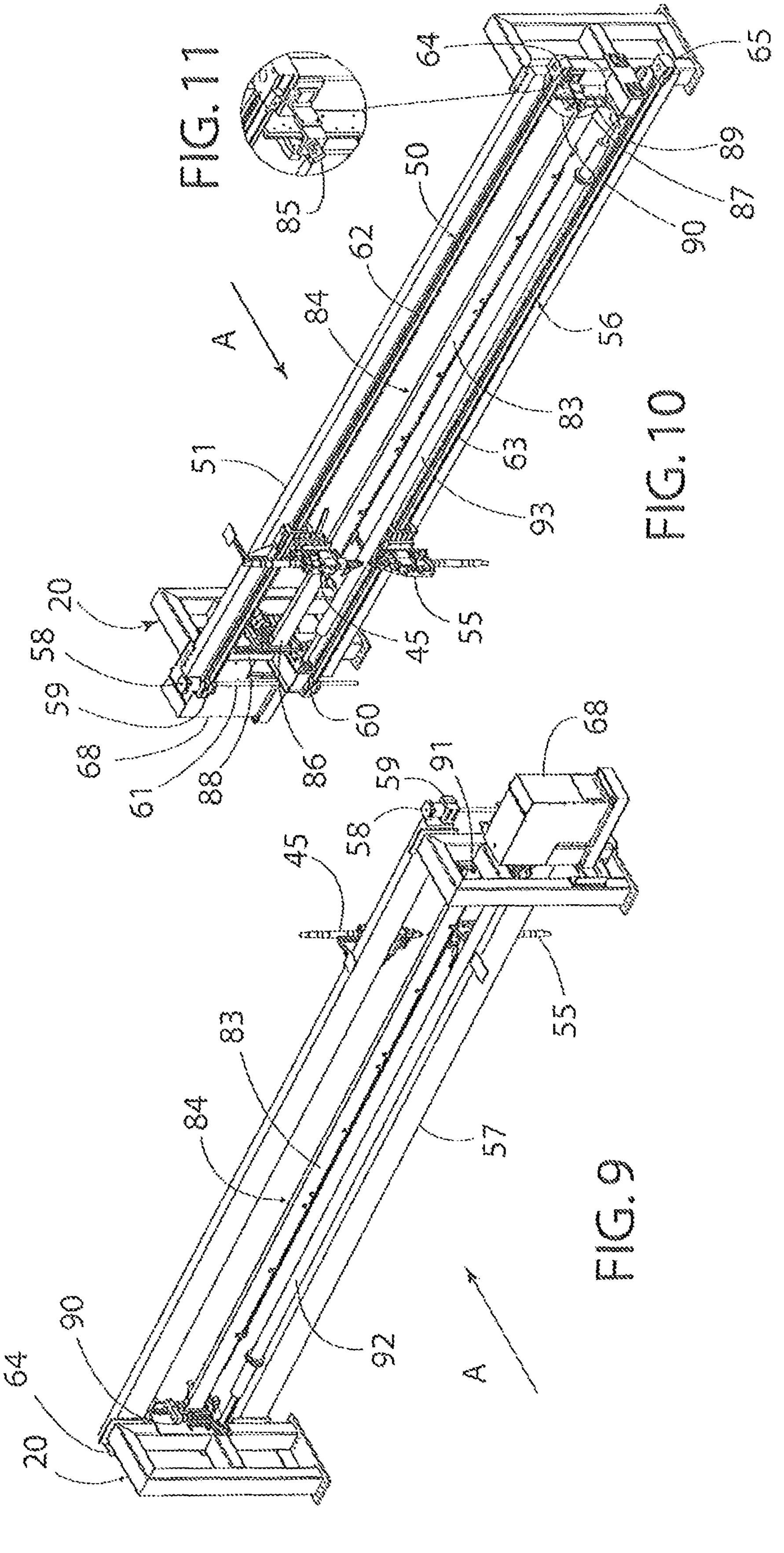
FIG. 9 is an isometric view of a first gantry of the apparatus of FIG. 1.
FIG. 10 is an isometric view of the first gantry from a different angle.
FIG. 11 is an enlarged view of a portion of the gantry of FIG. 10 showing a laser.

With further reference to FIGS. 9 and 10, first gantry 20 includes an upper powered screw-driving head 45 that is movably mounted to an upper rail 50 that is secured to an upper cross member 51 of first gantry 20, and a lower powered screw driving head 55 that is movably connected to a lower rail 56 that is mounted to a lower cross member 57 of first gantry 20. An electric servo motor 58 is connected to upper and lower drive pulleys 59 and 60, respectively via a vertical shaft 61. Upper and lower looped belts 62 and 63, respectively, extend around upper and lower idler pulleys 64 and 65, respectively. Powered screw driving heads 45 and 55 are connected to looped belts 62 and 63, respectively. Powered screw driving heads 45 and 55 are connected to looped belts 62 and 63, respectively, and simultaneously shift the powered screw driving heads 45 and 55 along the rails 50 and 56 in a "Y" direction that is perpendicular to the "X" direction upon actuation of electric servo motor 58. The powered screw driving heads 45 and 55 are vertically aligned and simultaneously drive screws into upper and lower sides of the joints of truss 2. Flexible pneumatic and/or electric lines extend through a flexible member 66 of a known design. An automatic screw storage-feeder unit 68 is mounted to the gantry 20, and supplies screws to the powered screw driving heads 45 and 55 as needed. The powered screw driving heads 45 and 55 and the screw storage-feeder unit 68 are commercially available units, and it will therefore not be described in detail.

The second gantry 30 (FIG. 6) also includes an upper powered screw driving head 70 and lower powered screw driving head 71 that are mounted to second gantry 30 via upper and lower rails 72 and 73. An electric servo motor 74 is connected to a vertical shaft 77. Drive pulleys 78 and 79 are mounted on shaft 77, and move looped belts 75 and 76 which extend around idler pulleys 80 and 81 to thereby simultaneously shift the powered screw driving heads 70 and 71 in the "Y" direction along rails 72 and 73 of second gantry 30. Second gantry 30 includes a second screw storage-feeder unit 82 that is substantially the same as the screw storage and feed unit 68 of first gantry 20.

Thus, actuation of servo 23 of first gantry 20 simultaneously moves powered screw driving heads 45 and 55 in an X direction, and actuation of servo 58 moves the screw driving heads 45 and 55 in the Y direction. Similarly, actuation of servo 33 of second gantry 30 moves the powered screw driving heads 70 and 71 in the X direction, and the actuation of servo 74 moves the powered screw driving heads 70 and 71 in the Y direction.

With further reference to FIGS. 9-11, a laser 85 is mounted to first gantry 20. As discussed in more detail below, laser 85 generates a visible line on a truss 2 as it is fed into the apparatus 1 in the direction of the arrow A such that the position of truss 2 relative to apparatus 1 can be set prior to installation of the fasteners.

Figure 12:
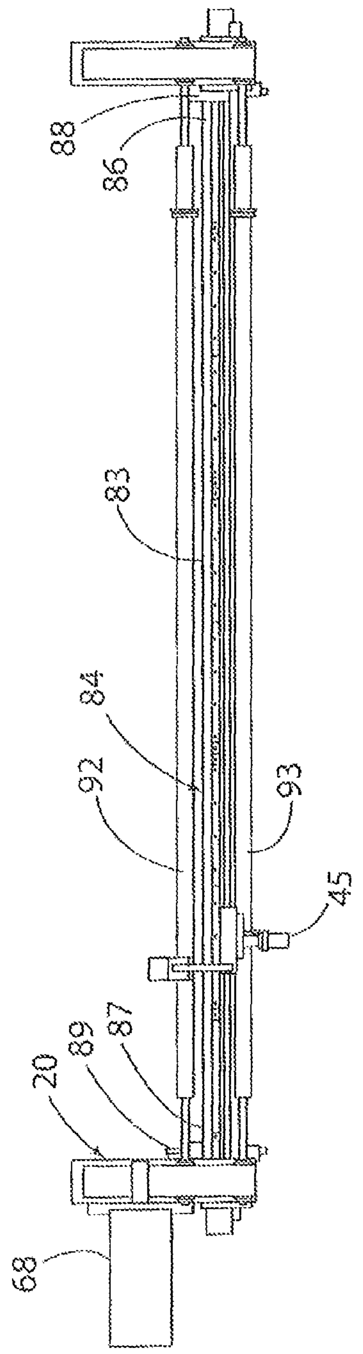
FIG. 12 is a top plan view of the first gantry.
Figure 13:
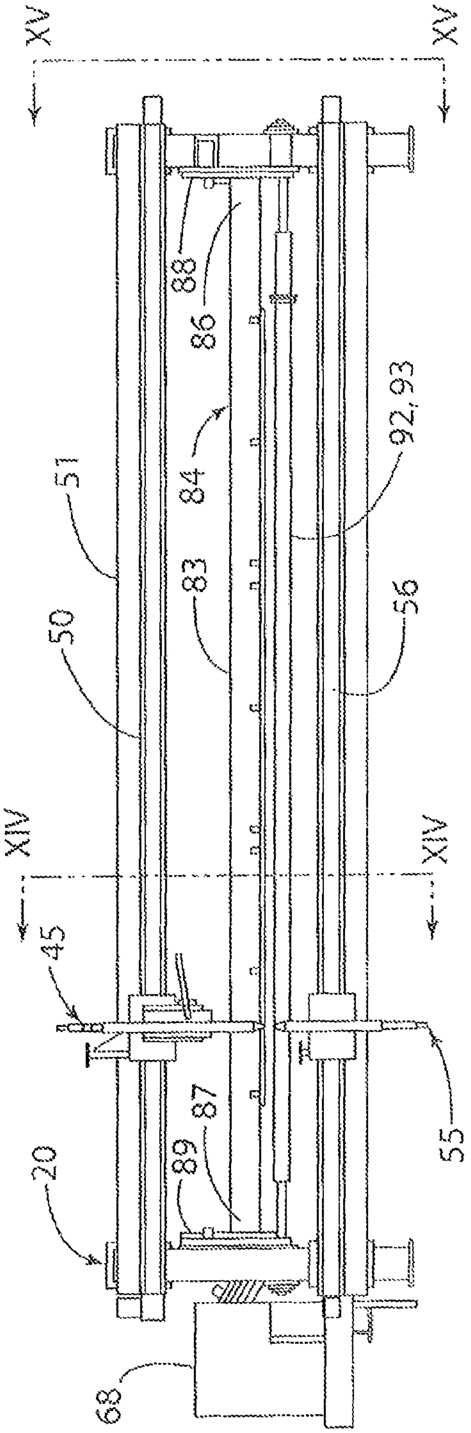
FIG. 13 is a front elevational view of the first gantry.
Figure 15:
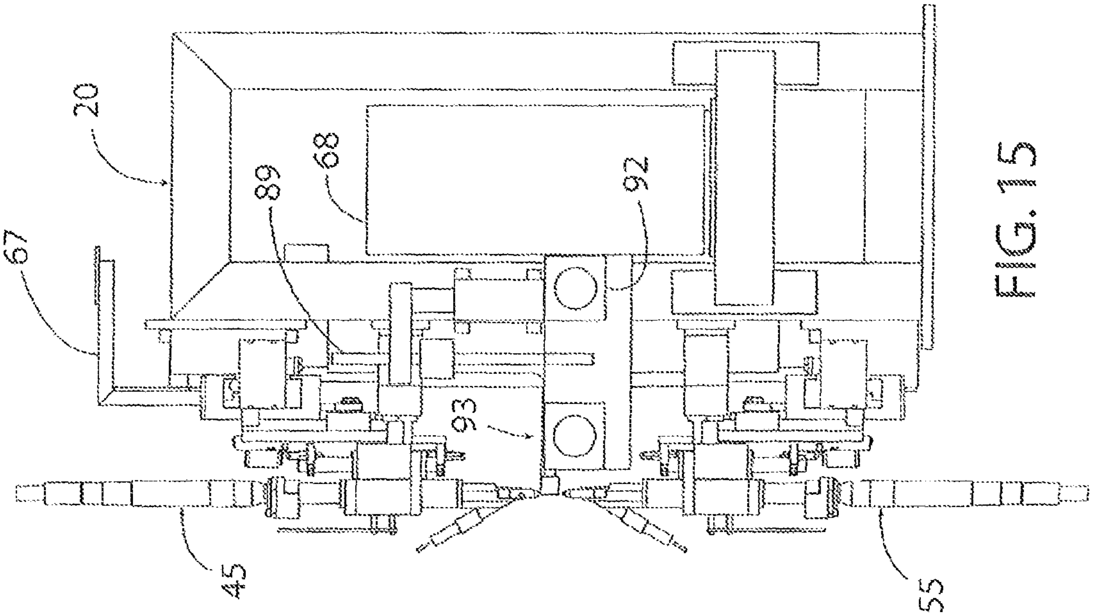
FIG. 15 is an elevational view of the first gantry taken along the line XV-XV.
Figure 14:
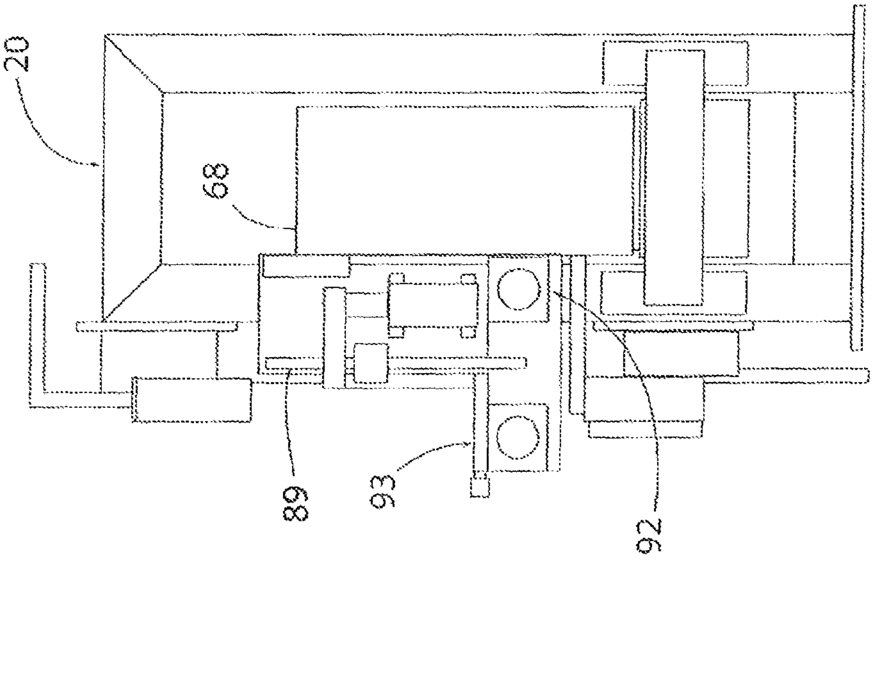
FIG. 14 is a sectional view of the first gantry taken along the line XIV-XIV.

With reference to FIG. 10, first gantry clamp 84 of first gantry 20 includes an elongated clamp member 83 that is vertically movable. The opposite ends 86 and 87 of clamp member 83 are mounted to vertical linear guides 88 and 89, and powered actuators such as pneumatic cylinders 90 and 91 are operably connected to clamp member 83, such that actuation of pneumatic cyclinders 90 and 91 shifts the clamp member 83 vertically. Elongated rollers 92 and 93 are positioned below the elongated clamp member 83, and provide support for a truss 2 positioned in the apparatus 1. The clamp member 83 is positioned between the rollers 92 and 93 in plan view (FIG. 12), such that the rollers 92 and 93 provide a clamping surface against which the elongated clamping member 12 acts. Clamp 96 (FIG. 5) of second gantry 30 is a mirror image of gantry clamp 84, and includes a vertically movable elongated clamp member 97 positioned above rollers 94 and 95.

Figure 2:
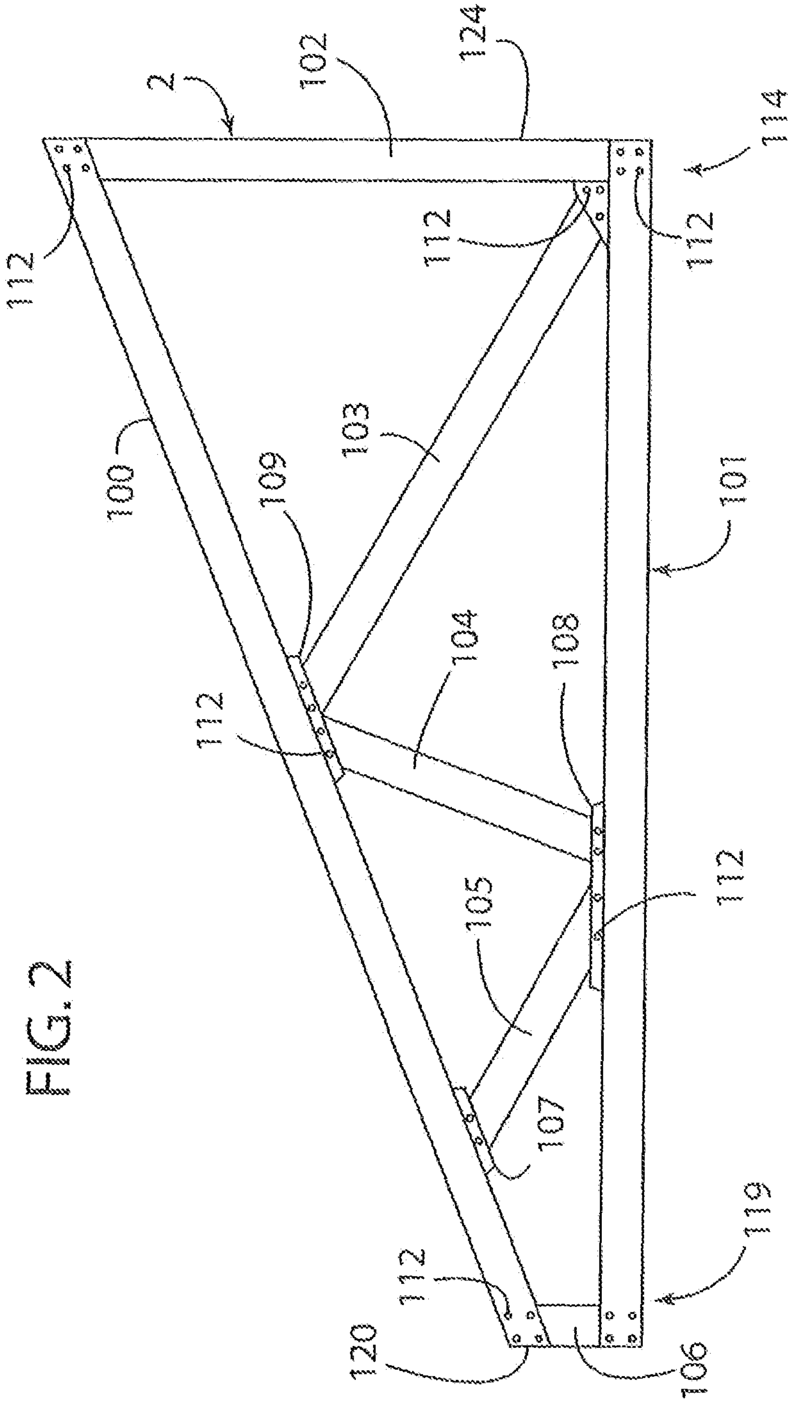
FIG. 2 is an example of a building truss.

With reference back to FIG. 2, a typical truss 2 includes an upper chord 100, and a lower chord 101. One or more web members 102-106 extend between the upper and lower chords 100 and 101, respectively. One or more plate connectors or brackets 107-110 may be positioned at the opposite ends of the webs to interconnect the web members and the chords. A plurality of screws 112 are driven through the chords, webs, and plate members to thereby rigidly interconnect the truss members. The screws 112 are positioned according to a predetermined pattern specifying the location of the screws 112, and the permitted tolerance for the screws 112.

A controller 115 (FIG. 1) is operably connected to the apparatus 1, and actuates the various clamps and the actuators of apparatus 1. In a preferred embodiment, controller 115 is programmed such that the upper and lower screw driving heads 45 and 46 move together simultaneously in a "mirror image" manner and simultaneously drive threaded fasteners such as screws 112 (FIG. 2) into opposite sides of trusses 2 at the same horizontal positions. Upper and lower powered screw driving heads 70 and 71, respectively, also operate simultaneously in a minor image fashion. Controller 115 (FIG. 1) includes a display screen 116 and an input panel 117. One or more sets of data including locations of screws 112 for a particular truss 2 may be stored in controller 115. Also, the sequence in which the screws 112 are driven by the powered screw heads 45, 46, 70 and 71 may also be stored in controller 115. A data file including the locations of the screws, the expected torques required to drive the screws and other fastener installation parameters, and screw sequence information is generated by the method/program described in above-identified co-pending U.S. patent application Ser. No. 11/962,702 . This data file is loaded into controller 115 and the data file is utilized by controller 115 to drive screws 112. As discussed above, trusses 2 may have a variety of different configurations with various patterns and locations for the screws 112. Controller 115 may store screw location and screw driving sequence information for a variety of trusses 2.

During operation, an operator selects a cycle (data file) for a particular truss 2 that includes the proper screw pattern for the truss 2 and an optimized screw driving sequence. One or more such cycles may be stored in controller 115, or stored in other media that can be loaded into controller 115. In this way, apparatus 1 can be utilized to assemble trusses having different sizes, numbers, and orientations of chords and webs, or other variables. Prior to loading trusses 2 onto input supports 8 (FIGS. 3, 4), the trusses 2 are "temporarily" assembled utilizing known manual techniques to position the chords, web members, and plates relative to one another. One or more fasteners such as screws or the like may be driven at each joint to initially assemble the truss 2. This holds the trusses together until apparatus 1 drives the required number of fasteners to provide a fully assembled truss. It will be understood that other fastening arrangements such as the tack welding or the like could also be utilized for initial assembly of the trusses and for final assembly. For example, rivet driving heads or welders could be utilized in conjunction with, or instead of, screw driving heads 45, 46, 70 and 71. The remaining screws, fasteners, or the like are then driven into truss 2 by apparatus 1 as described below.

A truss 2 is manually positioned on input support 8 (FIG. 1) with a chord 101 aligned with a side rail 118 of input support 8. As a truss 2 is first loaded into apparatus 1, a front portion 119 (FIG. 1) of a temporarily assembled truss 2 is manually positioned in workspace 6, on the inside of powered infeed clamp 10. The apparatus 1 is initially in a "home" position wherein all clamps are retracted (i.e. undamped), and wherein first gantry 20 is positioned directly adjacent the input side 4, and second gantry 30 is at its home position directly adjacent output side 5 of apparatus 1.

In the illustrated example, the infeed clamp 10 is first actuated, thereby clamping truss 2 in a stationary position. The operator then "jogs" the first gantry 20 utilizing a "jog" button on input panel 117 of controller 115 to thereby move the first gantry 20 towards input side 4 of apparatus 1 in small steps or increments by the operator. As discussed above, a laser 85 is mounted to first gantry 20. As the gantry 20 is "jogged" towards the input side 4 of apparatus, the beam from laser 85 eventually aligns with the front edge 120 or other feature having a known location on truss 2. If the operator initially moves the truss 2 too far into apparatus 1, such that laser 85 illuminates a portion of truss 2 that is spaced inwardly from front edge 120 (or other locating feature), the operator may then jog gantry 20 back towards output side 5 of apparatus 1 until laser 85 is incident on front edge 120 or other locating feature of truss 2. In this way, the truss 2 can be positioned relative to apparatus 1, such that the fasteners can be installed at the proper locations of truss 2. Also, other sensors and/or switches or the like, other than laser 85, may be utilized to detect the position of a truss 2 at the input side 4 of frame structure 3. Such sensors may be operably coupled to controller 115 to provide a signal if a truss is present and/or signal the position of a truss 2 to controller 115.

After the operator has positioned the first gantry 20 and truss 2 with light from laser 85 just contacting the front edge 120 of truss 2, the operator actuates a "cycle start" program in controller 115. Controller 115 then generates a signal to the first gantry clamp 84 on gantry 20 to cause the gantry clamp 84 to clamp onto truss 2. Controller 115 then generates a signal to retract (unclamp) infeed clamp 10, and then moves first gantry 20 (and truss 2) towards output side 5 to a first index position via actuation of electric motor 23. As discussed in more detail below in connection with FIG. 16, a plurality of index lines for truss 2 are generated to form index areas or sections of truss 2 corresponding to the maximum area for which fasteners can be driven by gantries 20 and 30 without further advancing truss 2. In general, the first index position/line is chosen such that first gantry 20 is positioned immediately adjacent second gantry 30, and second gantry 30 is immediately adjacent output side 5. The controller 115 then causes the infeed clamp 10 to clamp onto truss 2, and first gantry clamp 84 is then retracted. At this point, an end portion 119 (FIG. 2) of the truss 2 is positioned within the work envelope supported by the stationary claim 10, and by rollers 92 and 93 of first gantry 20. When the truss 2 is in this position, first gantry 20 can access the joints and screw locations of truss 2 adjacent front edge 120 of truss 2. As discussed in more detail below, the screw locations directly adjacent front edge 120 of truss 2 are "reserve" screw locations that can only be driven by first gantry 20. Although the powered screw driving heads 70 and 71 of second gantry 30 could be positioned above the reserve screw locations, the rollers 94 and 95 of second gantry 30 would be positioned beyond the edge 120 of truss 2, such that the end 119 would not be supported if second gantry 30 were to drive the screws at the "reserve" locations.

Controller 115 then generates a series of signals to the first gantry 20, thereby causing the first gantry 20 to drive the screws into the "reserve" screw locations adjacent front edge 120 of truss 2. The screw heads 45 and 55 of first gantry 20 move to the proper screw locations in the X-Y plane upon actuation of first servo 23 to move gantry 20 in the X direction and actuation of the servo 58 to shift the screw heads 45 and 55 in the Y direction along gantry 20. At each screw location, the screw heads 45 and 55 simultaneously drive screws into the upper and lower sides of the truss 2.

After gantry 20 drives the screws at the reserve locations, controller 115 moves gantry 20 back to its home position adjacent input side 4 of apparatus 1. Controller 115 then causes gantries 20 and 30 to begin driving fasteners at the fastener locations within the first area defined by the first index line. As described in more detail below, gantries 20 and 30 start at opposite sides of the area of truss 2 within the work envelope, and move towards one another according to the control logic described below.

After all of the screws in a particular work area of truss 2 are driven, the first gantry 20 is moved to its home position at the forward edge of the work envelope at the input side 4 of apparatus 1, and the first clamp 84 of gantry 20 is clamped onto the truss 2. As first gantry 20 is moving to its home position, the second gantry 30 moves to an intermediate position adjacent the position where the last screw was driven by gantry 20. In general, the intermediate position of second gantry 30 will be in the vicinity of the center of the work envelope of apparatus 1, midway between the input side 4 and output side 5 of apparatus 1. In this position, rollers 94 and 95 of second gantry 30 support the portion of truss 2 at the center of the work envelope with clamp 96 of second gantry 30 in the restricted position. Controller 115 then moves first gantry 20 towards second gantry 30 while second gantry 30 remains stationary. Once first gantry 20 is directly adjacent second gantry 30, controller 115 causes second gantry 30 to move towards output side 5 of apparatus 1. Thus, first gantry 20 and second gantry 30 move together towards output side 5 of apparatus 1. Once gantry 30 reaches a position directly adjacent output side 5, controller 115 stops gantries 20 and 30, and actuates stationary clamps 10 and 11. Controller 115 then retracts clamp 84 of first gantry 20, and moves first gantry 20 back to its home position directly adjacent input side 4 of apparatus 1.

Controller 115 then actuates the first servo 23 to move gantry 20, and servo 58 to move the powered screw driving heads 45 and 55 of first gantry 20 to the screw positions for each of the joints in the next work area of truss 2, and the controller 115 also actuates the second servo 33 to move the second gantry 30 in the X direction, and also actuates the servo 74 to shift the powered screw driving heads 70 and 71 of second gantry 30 in the Y direction to the various screw positions in the area of truss 2 within the work area of truss 2. For each area of truss 2, the first gantry 20 and second gantry 30 drive the fasteners in a sequence that generally causes the gantries 20 and 30 to move towards one another. Also, as described in more detail below, although each of the gantries 20 and 30 initially drive screws according to a predefined sequence, the control logic utilized by controller 115 accounts for deviations in the actual sequence of the installation of the screws due to variations in the number of alternate fasteners that may be driven at a particular joint due to fasteners not meeting/satisfying the predefined fastener installation parameters/criteria.

The process of moving or indexing the truss 2, followed by driving screws into the truss is repeated for each area of truss 2, until the last area of truss 2 adjacent rear edge 124 (FIG. 2) of truss 2.

As discussed above, during movement ("indexing") of truss 2, clamp 84 of first gantry 20 is clamped onto truss 2, and gantries 20 and 30 move to the output side 5 of apparatus 1. When the trailing end portion 114 (FIG. 2) of truss 2 is reached, movement of gantries 20 and 30 to the output side 5 of apparatus 1 will cause truss 2 to be positioned with end portion 114 extending into the workspace in a cantilevered manner, with trailing edge 124 of truss 2 spaced inwardly from input side 4 such that infeed clamp 10 cannot clamp truss 2. At this point, controller 115 actuates outfeed clamp 11 to clamp truss 2, and then retracts clamp 84 of first gantry 20, and moves first gantry 20 to a start position just inside of edge 124 of truss 2 such that truss 2 is supported by rollers 92 and 93 of first gantry 20. In general, truss 2 will include some reserve screw locations directly adjacent edge 124 of truss 2 that cannot be driven by first gantry 20 because movement of first gantry 20 to a position to drive these screws would move rollers 92 and 93 of first gantry 20 beyond the edge 124 of truss 2. First gantry 20 and second gantry 30 then begin to drive all of the screws in the last index area, with gantries 20 and 30 generally moving towards one another in a manner that is similar to the sequence for the other index areas. Once gantries 20 and 30 have driven all screws in the last index area other than the reserve locations, controller 115 moves first gantry 20 to its home position adjacent input side 4 of apparatus 1. Controller 115 also moves second gantry 30 to a position directly adjacent edge 124 of truss 2, and second gantry 30 then drives the screws at the reserve locations adjacent edge 124 of truss 2. Once these fasteners have been driven, clamp 96 of second gantry 30 clamps onto truss 2 directly adjacent edge 124 of truss 2, and controller 115 retracts outfeed clamp 11. Second gantry 30 then moves to its home position adjacent output side 5 of apparatus 1 to move truss 2 most of the way out of apparatus 1. Clamp 96 of second gantry 30 is then retracted, and a worker manually pulls truss 2 completely out of apparatus 1 and onto supports 9. It will be appreciated that the sequence of operations just described is only one example of a possible sequence of operation for the apparatus 1.

As the apparatus 1 drives the screws at the screw locations, apparatus 1 monitors the operation of the powered screw driving heads 45, 46, 70, and 71, to ensure that the screws are installed properly. The powered screw driving heads 45, 55, 70, and 71 include sensors that measure various fastener installation parameters as the screws are driven into truss 2. These parameters may include the torque utilized to drive a sheet metal screw into a truss 2. In a preferred embodiment, the screws comprise self-drilling sheet metal screws that do not require drilling of holes and the like. The powered screw driving heads 45, 55, 70, and 71, also include one or more sensors that determine the angular positions of the screws as they are driven into a truss 2 and/or the rotational rate (r.p.m.) of the screw being driven, and/or the depth of the screw is driven. The side walls of the truss components such as the chords, web members, and plates may have various thicknesses, and the number of layers of material may also vary. The amount of torque required to drive a screw having a specific size/configuration through the layers of metal can be measured empirically or otherwise determined. Similarly, other expected screw installation parameters can also be determined. The method/program of co-pending U.S. patent application Ser. No. 11/962,702 generates an identifier (e.g., a number that is assigned to each fastener location). Controller 115 is programmed to retrieve a set of expected fastener installation parameters for each identifier. For example, all of the fastener locations at a given truss joint may have a number "5" assigned to them. In operation, controller 115 retrieves a group of expected fastener installation parameters associated with the number "5." These parameters may include the expected torque for all screws at a given truss, expected r.p.m., expected depth, and seating angle (the additional angle of rotation applied to the screw after the measured torque "spikes" upwardly upon contact of the screw head with the surface of the material the screw is being driven into). The expected fastener installation parameters such as the required torque data that is associated with each joint of truss 2 may be determined based on the number of layers of material the screw must go through at each screw location, and the thickness of each layer. The expected fastener installation parameters required parameters required for each screw location can be utilized by controller 115 to determine if a screw has been properly positioned or installed. For example, if the torque required to drive a screw at a particular location falls outside the expected range, it can be inferred that the screw was not properly installed due to screw being out of position or other such problem. Controller 115 may be programmed to drive additional (i.e. alternate) screws beyond the minimum number required for a particular joint if the measured screw parameters for a given screw vary more than the predetermined amount from the expected parameter. For example, if the torque and/or depth for a particular fastener as measured by one of the powered heads 45, 46, 70, 71 falls outside of an acceptable/expected range, the controller 115 determines that the fastener was not properly installed, and drives additional fasteners until the minimum number of fasteners for a specific joint is installed. In this way, the apparatus 1 ensures that each of the joints includes at least the minimum number of screws required.

In the event the controller 115 determines that all possible alternate screw driving locations have been utilized, but the minimum number of screws for a particular joint does not meet the pass/fail criteria, the controller notifies the operator via a display screen. The operator then manually marks the joint utilizing spray paint or the like, and additional screws are then driven manually to ensure the joint has the required number of properly installed screws. It will be understood that alternate marking techniques for such joints may be utilized. Also, the screw driving heads may include a marking device such as paint sprayer to automatically mark joints that do not meet the pass/fail criteria.

The program/method described in detail in co-pending U.S. patent application Ser. No. 11/962,702 divides the trusses into zones, and assigns each of the joints to a zone. The output of this program/method is in the form of a data file 121 loaded into controller 115.

Figure 16:
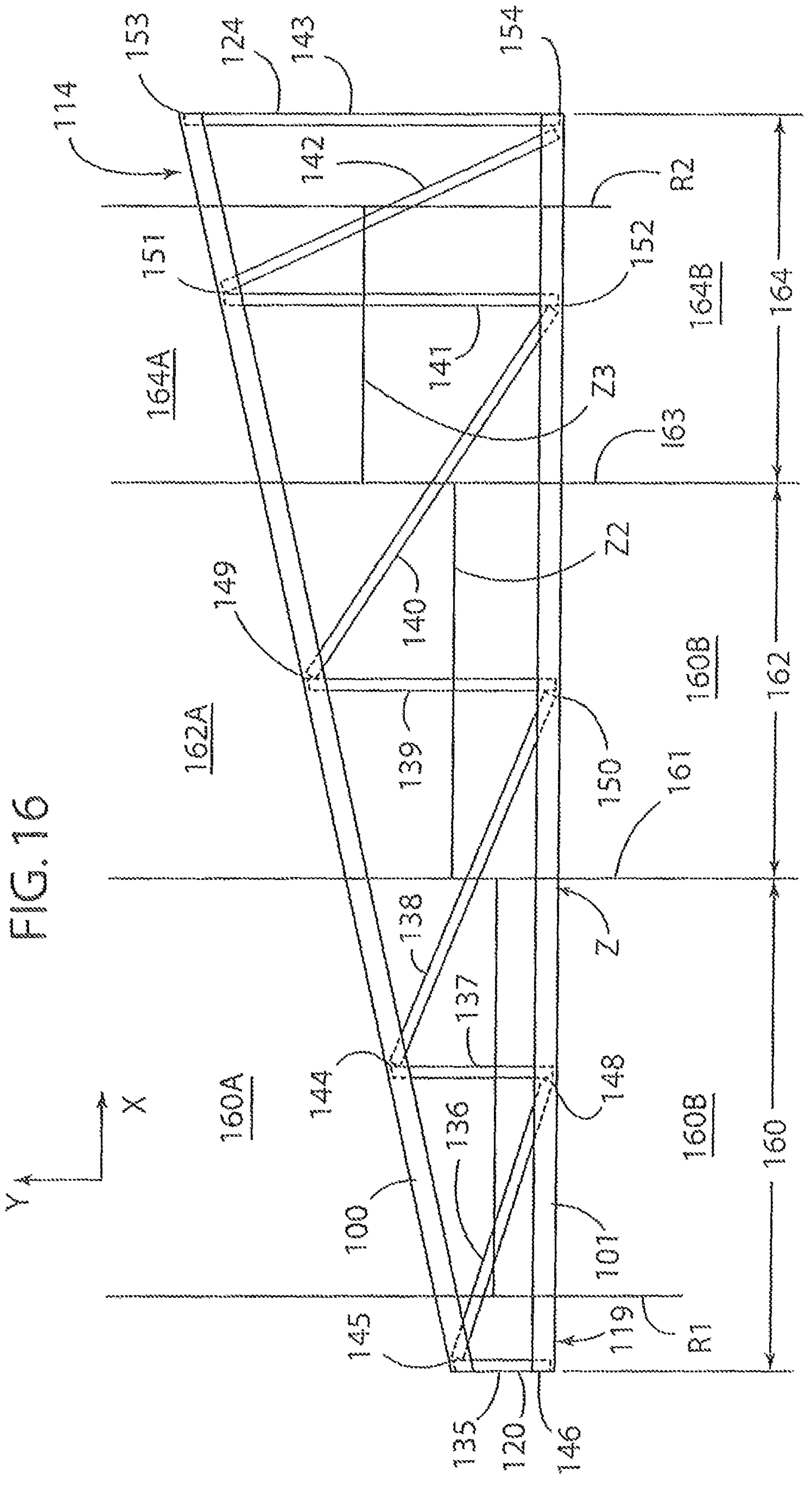

With reference back to FIG. 16, in order to generate data file 121 (FIG. 17) that is used by controller 115, the method/program of patent application Ser. No. 11/962,702 divides truss 2 into work areas to facilitate efficient operation of the truss assembly machine or apparatus 1. As discussed above, some of the fastener locations adjacent opposite edges 120 and 124 of truss 2 must be driven by first gantry 20 or second gantry 30, respectively. These fastener locations are referred to as "reserve" locations that are assigned to a specific one of the gantries 20 and 30. In FIG. 16, reserve lines R1 and R2 represent the boundaries of the areas of truss 2 adjacent the opposite edges 120 and 124 of truss 2 in which the fastener locations are designated as reserve fastener locations by the program/method of U.S. patent application No. 11/962,702 because screws in these areas can only be driven by one of the gantries 20 and 30. In general, screws can be driven by either of the gantries 20 and 30 for all fastener locations other than the reserve locations.

Truss 2 includes chords 100 and 101, and a plurality of web members 135-143 extending between chords 100 and 101 to from a plurality of joints 145-154.

In the illustrated example. All of the fastener locations at joints 145 and 146 are reserve locations that are driven by first gantry 20 as described above. After the fasteners 112 at joints 145 and 146 are driven by first gantry 20, the truss assembly machine 1 advances the truss 2 as described above, and the gantries 20 and 30, drive fasteners in joints 147 and 148 in first index area 160 between edge 120 of truss 2 and a first index line 161. The distance between edge 120 and first index line 161 is no more than the work envelope (i.e., the maximum possible area that can be worked on by the gantries 20 and 30 without moving the truss 2). When generating data file 121, the method/program of U.S. patent application No. 11/962,702 generates additional index lines until the entire truss 2 is divided into index areas. In the illustrated example, a second index line 163 is generated to define a second index area 162 between index lines 161 and 163, and a third index area 164 between index line 163 and edge 124 of truss 2. The width of second index area 162 is preferably equal to the length of the work envelope of apparatus 1. If a particular truss is longer than the truss 2 of FIG. 16, the method/program generates additional index lines/index areas until the entire truss is divided up into index areas.

The program of U.S. patent application No. 11/962,702 also generates a plurality of zone lines Z1, Z2, and Z3. The zone lines Z1, Z2, and Z3, extend between the reserve lines and the index lines, and are orthogonal relative to the reserve and index lines. In the illustrated example, zone line Z1 extends between reserve line R1 and first index line 161, and zone line Z2 extends between index lines 161 and 163, and zone line Z3 extends between index line 163 and reserve line R2. The zone lines Z1, Z2, and Z3, divide the index areas 160, 162, and 164, into zones 160A and 160B, 162A and 162B, 164A and 164B, etc.

The method/program thereby generates output file 121 (FIG. 17) listing the fasteners "F" according to the assigned sequence, wherein the first fastener 122 and its associated data is the top row of the data file, the second fastener 123 is the second row, etc. A first column 125 includes a letter "F" if the row of data is for a primary fastener location and an "S" if the row of data is for an alternate fastener location.

The primary fastener locations represent the screws that are always driven at a joint. The number of primary fasteners for each joint is equal to the minimum number of fasteners required for a specific joint as determined by the engineering software utilized to generate the joint strength requirements. This engineering software is commercially available, and it will not, therefore, be described in detail herein. The alternate fastener locations "s" represent locations at a joint that are available for driving additional screws if one or more of the primary fasteners are not driven properly according to the fastener installation parameters for the fastener location.

Second column 126 of file 121 lists the X coordinates for each fastener, and third column 127 lists the Y coordinate for each fastener. A fourth column 128 lists the "fastener value" for each fastener. The fastener value is a number assigned to each fastener location based upon the thicknesses of the chord, web, and plate (if present) the fastener is to be driven through at that fastener location. Controller 115 is programmed to retrieve expected fastener data from a look up table (not shown) based on the fastener value. This expected fastener data is compared to measured fastener variables such as the applied torque values by controller 115 as the fastener is being driven to determine if the fastener is "good" (i.e. it was properly driven through all of the plates). If a fastener is not "good", alternate fasteners are driven at the joint at alternate fastener locations S until the minimum number of "good" fasteners are driven at the joint.

A fifth column 129 of file 121 lists the plate number, a sixth column 130 lists the joint number, and the seventh column 131 lists the zone number corresponding to the zones 160A, 160B, 162A, 162B, etc. in FIG. 16.

If two adjacent joints both have the same plate, they will be assigned the same plate number. Controller 115 is programmed such that all joints having the same plate number are grouped together, and only one of the gantries 20, 30 will be assigned to all joints having the same plate number. This avoids the problem of physical interference between the two gantries 20, 30 that would otherwise occur if both gantries 20 and 30 attempted to drive fasteners in closely adjacent joints having the same plate number. It will be understood that two adjacent joints may be assigned the same "plate number", even if the joints to not actually have a plate that is common (o both joints; the "plate number" represents a group of joints that are in close proximity such that only a single gantry 20 or 30 can drive fasteners in the group of joints.

Referring again to FIG. 17, in addition to the fasteners "F" and "S", output file 121 also includes reserve rows "R", and index rows "I". These rows correspond to the reserve rows R1 and R2 (FIG. 16) and the index lines 161, 163, etc.

The truss assembly machine 1 is programmed to utilize the output file 121 to assemble the truss 2 in an efficient manner. As discussed above, gantries 20 and 30 each have a "home" position. Gantry 20's home is the X position with the highest numerical value in the index area 160, 162, 164, for the index area in the work envelope of apparatus 1, and the second gantry 30's home is the lowest X position in the index area in the work envelope.

The controller 115 first determines which zone of the index area in the work envelope has the greatest number of fasteners. The first gantry 20 then starts driving fasteners at the joint closest to its home position and having the lowest Y value, and the fasteners are driven in the sequence previously determined by the program/method of U.S. patent application No. 11/962,702. The second gantry 30 also starts driving fasteners at the joint closest to its home position having the lowest Y value, in the sequence previously determined by the program/method of U.S. patent application No. 11/962,702.

Because the powered screw-driving heads 45, 46 and 70, 71 on the gantries 20 and 30, respectively, would physically interfere with one another if they were to attempt to simultaneously drive fasteners at the same joint, the controller 115 assigns a joint to a selected one of the gantries 20 and 30 at the time the next joint to be worked on is determined by controller 115. Once a joint is assigned to one of the gantries 20 and 30 by controller 115, the controller 115 that joint is no longer "available," and will not select a joint for the other of the gantries 20 and 30 that is already assigned. Controller 115 instead skips to the next "available" joint (an available joint is a joint that has not already been assigned). The next joint is selected by controller 115 to be the closest available joint to the home position for the other of the gantries 20 and 30, and having the lowest Y value. For the first gantry 20, this is the next available joint that is closest to the input side 4 of apparatus 1 having the lowest Y value. For the second gantry 30, this is the next available joint that is closest to the output side 5 of apparatus 1 with the lowest Y value. If no joints in the zone are available for a gantry that has completed a joint because all fasteners have been driven and the last joint in the zone has been assigned, the controller 115 will then cause the gantry to go to the next zone within the index area being worked on. The gantry will then proceed within the next zone according to the rules set forth above. If all zones within an index area have already been completed (i.e., all fasteners driven), the controller 115 will cause the gantry to wait (i.e., not move) until the other gantry has completed the last joint in the index area. Controller 115 then indexes the truss to move the next index area into the work envelope of apparatus 1, and the gantries 20 and 30 again proceed according to the rules set forth above until all fasteners are driven in the next index area.

Because the gantries 20 and 30 start on opposite sides of the work envelope at their respective home positions and then move towards one another, interference between the gantries 20 and 30 is minimized. Also, the rules by which the controller 115 select joints for the gantries 20 and 30 minimizes the movement of the gantries 20 and 30, and also minimizes time spent by one gantry waiting for the other to complete a joint and move out of the way. Because the total number of fasteners that need to be driven at each joint will vary depending upon how many alternate fasteners are required, it is not normally possible to predict in advance exactly how much time will be required to drive all of the fasteners at a given joint. The method just described by which the controller 115 selects joints and controls gantries 20 and 30 permits the truss assembly machine 1 to adapt to different conditions without unduly hurting efficiency.

The truss assembly apparatus 1 of the present invention substantially reduces the amount of manual labor required to assemble trusses. Further, the apparatus 1 ensures that the proper number of screws are utilized for a given truss design and that the screws are positioned within allowable tolerances. The apparatus 1 can be preprogrammed to accommodate a large number of trusses having different configurations.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. An apparatus for assembling trusses, the apparatus defining an input side and an output side and a workflow path extending from the input side to the output side, the apparatus comprising:

a primary structure;

a powered infeed clamp mounted to the primary structure, wherein the infeed clamp is configured to clamp a truss at the input side of the primary structure and retain the truss in a stationary position relative to the primary structure;

a powered outfeed clamp mounted to the primary structure, wherein the outfeed clamp is configured to clamp a truss at the output side of the primary structure and retain the truss in a stationary position relative to the primary structure;

a first gantry having a first support;

a first powered actuator operably coupled to the first gantry and shifting the first gantry along the workflow path between a first upstream position and a first downstream position;

a second gantry having a second support structure;

a second powered actuator operably coupled to the first gantry and shifting the second gantry along the workflow path between a second upstream position and a second downstream position;

a first powered screw driving head movably mounted to the first support structure;

a third powered actuator operably coupled to the first powered screw driving head and shifting the first powered screw driving head along the first support structure;

a second powered screw driving head movably mounted to the first support structure;

a fourth powered actuator operably coupled to the second powered screw driving head and shifting the second powered screw driving head along the second support structure; and a controller coupled to the powered infeed and outfeed clamps, the first, second, third, and fourth powered actuators, and the first and second powered screw driving heads, wherein the controller is configured to actuate the powered infeed clamp and the powered outfeed clamp to selectively retain a truss in the apparatus, the controller further configured to actuate the first, second, third, and fourth powered actuators to shift the first and second powered screw driving heads to a plurality of fastener locations, the controller actuating the powered screw driving heads to drive screws at the fastener locations.

2. The apparatus of claim 1, wherein:

the workflow path is linear.

3. The apparatus of claim 1, wherein:

the workflow path extends horizontally.

4. The apparatus of claim 2, including:

a first linear guide movably interconnecting the first powered screw driving head and the first support structure;

a second linear guide movably interconnecting the second powered screw driving head and the second support structure.

5. The apparatus of claim 1, including:

an indicator configured to detect the presence of a truss positioned at the input side.

6. The apparatus of claim 5, wherein:

the indicator comprises a laser adapted to illuminate a portion of a truss positioned at the input side.

7. The apparatus of claim 1, including:

first linear guides interconnecting the first gantry to the primary structure;

second linear guides interconnecting the second gantry to the frame structure; and wherein:

the first and second powered actuators comprise electric motors.

8. The apparatus of claim 1, wherein:

the first and second powered screw driving heads are configured to drive screws downwardly into trusses positioned below the first and second powered screw driving heads; and including:

a third powered screw driving head movably mounted to the first support structure for driving screws upwardly into trusses positioned above the third powered screw driving head;

a fourth powered screw driving head movably mounted to the second support structure for driving screws upwardly into trusses positioned above the fourth powered screw driving head.

9. The apparatus of claim 8, wherein:

the controller is configured to simultaneously move the first and third powered screw driving heads in the same directions and at the same velocities, and to move the second and fourth powered screw driving heads in the same directions and at the same velocities.

10. The apparatus of claim 1, wherein:

the powered infeed and outfeed clamps comprise elongated members extending transverse to the workflow path, and linear powered actuators operably connected to opposite ends of the elongated members and shifting the elongated members to clamp trusses and retain the trusses in a stationary position relative to the primary structure.

11. The apparatus of claim 1, wherein:

the powered infeed and outfeed clamps are configured to retain trusses in a stationary position relative to the primary structure; and including:

a first gantry clamp on the first gantry configured to retain a truss in a stationary position relative to the first gantry, such that a truss retained by the first gantry clamp moves with the first gantry relative to the primary structure upon movement of the first gantry;

a second gantry clamp on the second gantry configured to retain a truss in a stationary position relative to the second gantry, such that a truss retained by the second gantry clamp moves with the second gantry relative to the primary structure upon movement of the second gantry.

12. The apparatus of claim 11, wherein:

the controller is configured to selectively actuate the powered infeed and outfeed clamps, and the first and second powered actuators in a sequence that moves the truss along the workflow path.

13. The apparatus of claim 12, wherein:

the controller is configured to cycle the apparatus to drive screws into a truss in the apparatus, wherein the cycle includes:

actuating the first gantry clamp to clamp onto the truss;

retracting the infeed clamp;

moving the first gantry towards the output side to an index position to thereby move the truss along the workflow path;

actuating the powered infeed clamp to clamp onto the truss;

retracting the first gantry clamp to permit movement of the first gantry relative to the truss;

actuating at least a selected one of the powered actuators to move at least a selected one of the powered screw driving heads to a predetermined fastener location;

actuating at least a selected one of the powered screw driving heads.

14. The apparatus of claim 13, wherein:

the cycle further includes:

moving the first gantry to the first upstream position prior to actuating at least a selected one of the powered actuators to move at least a selected one of the powered screw driving heads to a predetermined fastener location;

moving the second gantry to the second downstream position prior to actuating at least a selected one of the powered actuators to move at least a selected one of the powered screw driving heads to a predetermined fastener location.

15. The apparatus of claim 14, wherein:

the controller is configured to utilize truss data including a plurality of truss joints, each truss joint including one or more fastener locations associated with each truss joint.

16. The apparatus of claim 15, wherein:

the controller is configured to cause the first and second powered screw driving heads to move to the joints and drive a predetermined minimum number of screws at each truss joint.

17. The apparatus of claim 16, wherein:

the controller receives data measured during installation of the screws; and the controller compares the measured data to a predetermined fastener installation parameter to determine if the measured data satisfies predetermined criteria.

18. The apparatus of claim 17, wherein:

the controller is configured to utilize truss data including a minimum number of screws that must satisfy the predetermined criteria for each truss joint; and wherein:

the controller continues to drive screws at each truss joint until either the minimum number of screws for each truss joint that satisfy the predetermined criteria have been driven, or screws have been driven at all fastener locations for each truss joint.

19. The apparatus of claim 18, wherein:

the controller is configured to utilize truss data wherein each of the fastener locations for each truss joint are categorized as either primary fastener locations or alternate fastener locations, and wherein the number of primary fastener locations is equal to the minimum number of screws that must satisfy the predetermined criteria for each truss joint; and wherein:

the controller is configured to initially drive screws at the primary fastener locations, and to drive screws at the alternate fastener locations if at least one of the screws driven at the primary fastener locations does not satisfy the predetermined criteria.

20. The apparatus of claim 1, wherein:

the controller is configured to utilize truss data including a plurality of truss joints, each truss joint having at least one fastener location associated with the truss joint, and wherein the controller causes a selected one of the first and second gantries drives all of the screws at each truss joint.

21. The apparatus of claim 20, wherein:

the controller is configured to utilize truss data wherein the fastener locations are positioned within a plurality of index areas defined by index lines extending transverse to the workflow path, and wherein at least a selected one of the index areas defines at least first and second zones, and wherein at least a first truss joint is located in the first zone, and at least a second truss joint is located within the second zone; and wherein:

the controller is configured to initially cause the first gantry to initially cause the first gantry to drive screws at a selected one of the first and second truss joints and to cause the second gantry to drive screws at the other of the first and second truss joints.

22. The apparatus of claim 21, wherein:

the first powered screw driving head of the first gantry defines a first home position adjacent the input side of the apparatus;

the second powered screw driving head of the second gantry defines a second home position adjacent the output side of the apparatus and wherein:

the controller causes the first gantry to drive screws at the truss joint having a fastener location closest to the home position of the first powered screw driving head, and the controller causes the second gantry to drive screws at the truss joint having a fastener location closest to the home position of the second powered screw driving head.

23. The apparatus of claim 22, wherein:

the controller is configured to cause each gantry to drive fasteners at the truss joints within a selected zone without moving to truss joints outside the selected zone until all of the truss joints within the selected zone are completed.

24. The apparatus of claim 23, wherein:

a plurality of truss joints are located within the first zone, and a plurality of truss joints are located within the second zone, the controller causes the first gantry to move to the truss joints within the first zone in a sequence determined by the distance along the workflow path from the home position of the fastener locations of each truss joint with each truss joint in the sequence having a fastener location spaced a greater distance along the workflow path than the truss joint immediately preceding it.

25. The apparatus of claim 11, wherein:

the first and second gantry clamps each comprise a pair of elongated rollers extending transversely relative to the workflow path to movably support a truss when the first gantry clamp is in an unclamped state.

26. An apparatus for assembling trusses of the type having a plurality of truss members interconnected at joints comprising plate members overlying end portions of adjacent truss members, the apparatus comprising:

at least one stationary clamp for clamping a truss in a stationary position;

at least one powered fastener securing device configured for powered movement in a plane defined by first and second orthogonal directions and to install fasteners into truss members at a plurality of predetermined fastener positions, each of which is defined by coordinates lying in the plane, to thereby interconnect truss members that are being assembled by the apparatus;

at least one controller operably coupled to the powered fastener securing device, and wherein the at least one controller utilizes data comprising coordinates defining a plurality of fastener positions lying in the plane, wherein the controller causes the at least one powered fastener securing device to move relative to the clamp in the first and second directions to a plurality of the predetermined fastener positions at joints of a truss being assembled by the apparatus, the controller actuating the powered fastener securing device to drive a plurality of fasteners through the plate members and into the end portions of the truss members at the fastener positions and interconnect truss members of a truss being assembled by the apparatus.

27. The apparatus of claim 26, wherein:

the apparatus defines an input side and an output side;

the at least one stationary clamp comprises an infeed clamp positioned adjacent the input side of the apparatus; and including:

an outfeed clamp adjacent the output side of the apparatus.

28. An apparatus for assembling trusses of the type having a plurality of truss members interconnected at joints, the apparatus comprising:

at least one stationary clamp for clamping a truss in a stationary position;

at least one powered fastener securing device configured to install fasteners into truss members to thereby interconnect truss members that are being assembled by the apparatus;

at least one powered actuator that shifts the at least one fastener securing device relative to the clamp upon actuation of the powered actuator;

at least one controller operably coupled to the powered actuator and to the powered fastener securing device, and wherein the at least one controller signals the powered actuator and moves the at least one powered fastener securing device relative to the clamp to a plurality of predetermined fastener positions at joints of a truss being assembled by the apparatus, the controller actuating the powered fastener securing device to secure fasteners at the fastener positions and interconnect truss members of a truss being assembled by the apparatus;

a frame structure;

a gantry including an elongated linear guide, wherein the gantry is movably connected to the frame structure for movement in a first direction relative to the frame structure; and wherein:

the at least one fastener securing device is movably connected to the elongated linear guide for movement along the gantry in a second direction that is transverse to the first direction.

29. An apparatus for assembling trusses of the type having a plurality of truss members interconnected at joints, the apparatus comprising:

at least one stationary clamp for clamping a truss in a stationary position;

at least one powered fastener securing device configured to install fasteners into truss members to thereby interconnect truss members that are being assembled by the apparatus;

at least one powered actuator that shifts the at least one fastener securing device relative to the clamp upon actuation of the powered actuator;

at least one controller operably coupled to the powered actuator and to the powered fastener securing device, and wherein the at least one controller signals the powered actuator and moves the at least one powered fastener securing device relative to the clamp to a plurality of predetermined fastener positions at joints of a truss being assembled by the apparatus, the controller actuating the powered fastener securing device to secure fasteners at the fastener positions and interconnect truss members of a truss being assembled by the apparatus; and wherein:

the at least one powered fastener securing device comprises a powered screw driving device configured to store a plurality of screws , and to drive screws into the joints at the predetermined fastener locations.

30. An apparatus for assembling trusses of the type having a plurality of truss members interconnected at joints, the apparatus comprising:

a primary support structure having an input side and an output side and a flow path from the input side to the output side;

a powered conveyor adapted to move trusses being assembled by the apparatus along the flow path;

a powered fastener securing device that is movable in a first direction that is parallel to the flow path, and in a second direction that is transverse to the first direction;

a controller operably coupled to the powered conveyor and the powered fastener securing device, wherein the controller is configured to move the conveyor to a plurality of preselected positions to thereby move a truss along the flow path to a plurality of preselected positions, wherein the controller is further configured to move the powered fastener securing device in the first and second directions to a plurality of preselected fastener positions corresponding to joints of a truss being assembled by the apparatus, and to actuate the powered fastener securing device at the fastener positions.

31. The apparatus of claim 30, wherein:

the controller moves the powered fastener securing device to the preselected fastener positions in a preselected sequence.

32. The apparatus of claim 30, wherein:

the powered fastener securing device comprises a powered screw driving device.

33. An apparatus for assembling trusses of the type having a plurality of truss members interconnected at joints, the apparatus comprising:

a powered conveyor adapted to move trusses being assembled by the apparatus;

a powered fastener securing device that is movable to a plurality of predetermined positions;

a controller operably coupled to the powered conveyor and the powered fastener securing device, wherein the controller is configured to move the conveyor to a plurality of preselected positions to thereby move a truss to a plurality of preselected positions, wherein the controller is further configured to move the powered fastener securing device to a plurality of preselected fastener positions corresponding to joints of a truss being assembled by the apparatus, and to actuate the powered fastener securing device at the fastener positions; and wherein:

the apparatus includes a primary support structure;

the powered conveyor comprises a gantry having an elongated support structure movably mounted to the primary support structure for movement in a first direction, the gantry including an elongated guide extending along the support structure transverse to the first direction;

the truss retainer comprises a powered clamp mounted to the gantry; and the powered fastener securing device is movably mounted to the elongated guide of the gantry for reciprocating movement transverse to the first direction.

* * * * *